United States Patent [19]
Harpin et al.

[11] Patent Number: 5,787,214
[45] Date of Patent: Jul. 28, 1998

[54] CONNECTION BETWEEN AN INTEGRATED OPTICAL WAVEGUIDE AND AN OPTICAL FIBRE

[75] Inventors: Arnold Peter Roscoe Harpin, Oxford; Andrew George Rickman, Marlborough; Robin Jeremy Richard Morris, Oxford; John Paul Drake, Abingdon, all of United Kingdom

[73] Assignee: Bookham Technology Ltd., United Kingdom

[21] Appl. No.: 643,476

[22] Filed: May 6, 1996

[51] Int. Cl.⁶ .................................................. G02B 6/30
[52] U.S. Cl. ............................. 385/49; 385/50; 385/52
[58] Field of Search .............................. 385/15, 39, 49, 385/50, 52, 88

[56] References Cited

U.S. PATENT DOCUMENTS

| | | | |
|---|---|---|---|
| 4,966,433 | 10/1990 | Blonder | 350/96.17 |
| 4,973,133 | 11/1990 | Matz et al. | 385/49 |
| 5,046,809 | 9/1991 | Stein | 385/49 |
| 5,239,601 | 8/1993 | Denis et al. | 385/49 |
| 5,357,593 | 10/1994 | Bossler | 385/49 |
| 5,535,295 | 7/1996 | Matsumoto | 385/49 |
| 5,579,424 | 11/1996 | Schneider | 385/49 |

*Primary Examiner*—John D. Lee
*Attorney, Agent, or Firm*—Webb Ziesenheim Bruening Logsdon Orkin & Hanson, P.C.

[57] ABSTRACT

A connection between an integrated optical waveguide and an optical fibre has a layer of silicon in which a rib waveguide is formed separated from a substrate by a layer of silicon dioxide. A V-groove is formed in the substrate for receiving an optical fibre, and the V-groove is arranged to align the optical fibre at a predetermined angle with respect to the waveguide. The rib waveguide and the underlying layer of silicon dioxide are formed to overhang the end of the V-groove so that the end of the waveguide is in close proximity with the end of an optical fibre positioned in the V-groove. A method of forming a connection, in which the V-groove is etched using a material which etches the substrate material as opposed to the layer of silicon dioxide, is also disclosed. Finally, a method of connecting an integrated optical waveguide to an optical fibre using a connection as described above is disclosed.

26 Claims, 2 Drawing Sheets

1

CONNECTION BETWEEN AN INTEGRATED OPTICAL WAVEGUIDE AND AN OPTICAL FIBRE

BACKGROUND OF THE INVENTION (1) Field of the Invention

This invention relates to a connection between an integrated optical waveguide and an optical fibre.

(2) Description of Prior Art

Optical fibre communication systems and optical fibre based instruments and devices require the accurate alignment and reliable attachment of optical fibres with integrated optical devices.

Several alignment and attachment methods have been proposed but in order to provide efficient coupling between the integrated device and the optical fibre, it is necessary to align the fibre with the relevant part of the integrated device with great accuracy, often to within 0.5 microns. It has previously been proposed to position the fibre within a V-groove but connections based on this principle suffer from a variety of problems. One particular problem arises due to the fact that a V-groove formed by etching does not have an end face perpendicular to the base of the grave, instead the end face is inclined to the base of the groove. Attempts have been made to overcome this by making a saw-cut across the end of the groove to provide a perpendicular end-face or by inserting a lens between the waveguide and the fibre but both of these techniques are difficult to achieve and increase the complexity and hence cost of the connection.

The majority of connections described in the prior art are between optical fibres and waveguides formed of glass, e.g. phosphosilicate glass which has a similar refractive index to the core of the optical fibre.

SUMMARY OF THE INVENTION

According to a first aspect of the present invention, there is provided a connection between an integrated optical waveguide and an optical fibre, the integrated optical waveguide comprising a layer of silicon in which a rib waveguide is formed separated from a substrate by a layer of silicon dioxide, a V-groove being formed in the substrate for receiving an optical fibre and arranged so as to align the optical fibre at a predetermined angle to the waveguide, the rib waveguide and underlying layer of silicon dioxide being formed so as to overhang the end of the V-groove so the end of the waveguide is in close proximity with the end of an optical fibre positioned in the V-groove.

According to a second aspect of the invention, there is provided a method of forming a connection as described above.

According to a further aspect of the invention there is provided a method of connecting an integrated optical waveguide to an optical fibre using a connection as described above or a connection formed by the method described above.

BRIEF DESCRIPTION OF THE DRAWINGS

The invention will now be further described, merely by way of example, with reference to the accompanying drawings, in which.

DETAILED DESCRIPTION OF THE PREFERRED EMBODIMENT

Figure 1:
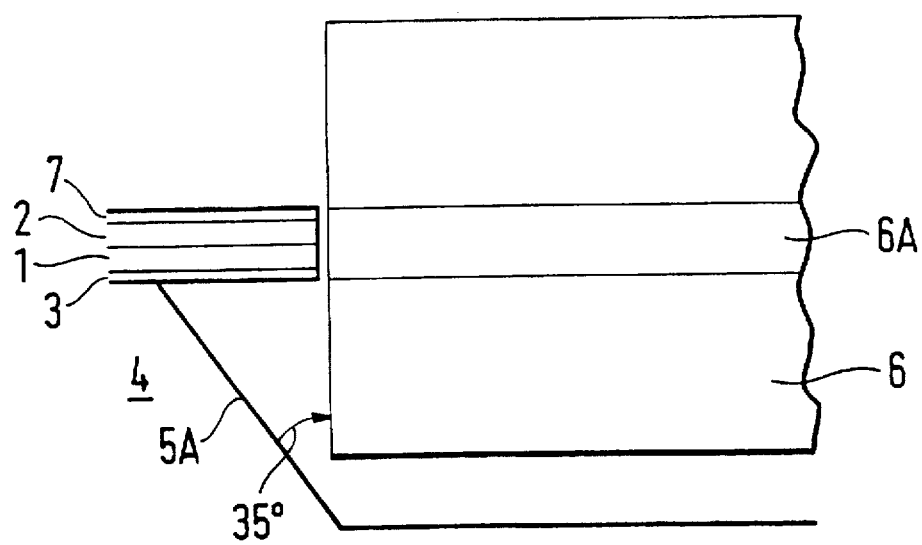
FIG. 1 is a schematic side view of one embodiment of a connection according to the present invention.

The drawings illustrate a silicon-on-insulator type of integrated optical waveguide which comprises a layer of silicon 1 in which a rib waveguide 2 is formed, an underlying insulating layer 3 of silicon dioxide and a substrate 4 of silicon. The underlying layer 3 of silicon dioxide has a lower refractive index than silicon rib waveguide 2 so that it confines optical waves within the rib waveguide. A layer of thermal oxide 7 is formed over the rib 2 to provide waveguide cladding. Such a waveguide may conveniently be formed from a conventional silicon-on-insulator wafer manufactured primarily for the construction of Very Large Scale Integrated (VLSI) electronic circuits with the thickness of the top layer of silicon increased, e.g. by epitaxial growth.

Further details of this type of waveguide and its method of manufacture are provided in PCT patent specification WO95/08787 and other publications referred to therein.

The rib waveguide typically has a width and height (measured from the underlying silicon dioxide layer) of around 4 microns and the layer of silicon dioxide typically has a thickness of about 0.4 microns. The core of the optical fibre with which the waveguide is to be aligned typically has a diameter of around 9 microns and the diameter of the whole fibre, including its cladding layer, is typically around 125 microns. Other dimensions are, of course, possible. In general, the dimensions of the rib waveguide would fall in the range 2 to 10 microns and the diameter of the optical fibre core in the range 5 to 10 microns.

As shown in the Figures, a V-groove 5 is formed in the silicon substrate 4. Such a V-groove can be formed in silicon with great accuracy using a KOH type of etch, such as CsOH, as the faces of the groove are etched along specific crystallographic planes within the silicon. The depth of the groove 5 can thus be accurately determined by precisely controlling the width of the groove by an appropriate masking technique. However, a feature of such a groove is that it does not have a perpendicular end face as the end face 5A is itself defined by a crystallographic plane within the silicon and, as shown in FIG. 1, the end face 5A is inclined at an angle of 35 degrees to the perpendicular. This means that an optical fibre 6 positioned within the groove 5 cannot be butted up to the end of a waveguide formed on the surface of the substrate 4.

In order to overcome this problem, the rib waveguide 2 is formed such that it projects over the end face 5A of the groove 5 so that the end of the waveguide 2 can be brought into close proximity with the end of the core 6A of an optical fibre 6 positioned in the groove 5. If the groove 5 has a depth of around 60 microns, the projecting portion of the waveguide 2 will thus have a length or around 80 microns.

Such a structure can be fabricated by using an anisotropic etchant (such as the KOH type of etch referred to above or one of its variants) which forms the groove 5 and at the same time undercuts the end of the optical waveguide 2 whilst the end face 5A of the groove is being formed without destroying the waveguide so that the latter remains overhanging toe end face 5A of the groove. This depends upon the use of an etch which selectively etches the substrate material, i.e. silicon, in favour of the insulating layer 3 of silicon dioxide. The underside of the silicon waveguide 2 is thus protected by the layer of silicon dioxide 3 during the etching process. The upper and side faces of the rib waveguide 2 are also protected during this process by providing a protective layer, e.g. of silicon dioxide, over the rib waveguide, e.g. by plasma enhanced chemical vapour deposition. This protective layer can also be used to protect the end face of the rib waveguide so as to protect the end face from damage and prevent the etchant attacking the silicon waveguide. The protective layer is removed at a later stage in the fabrication process.

Figure 2:
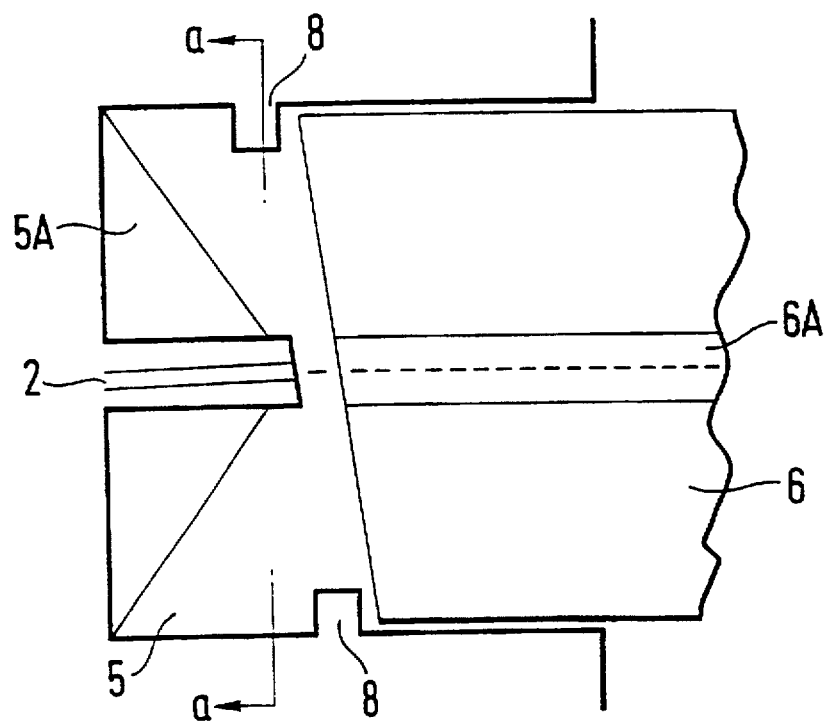
FIG. 2 is a plan view of the connection, shown in FIG. 1.
Figure 3:
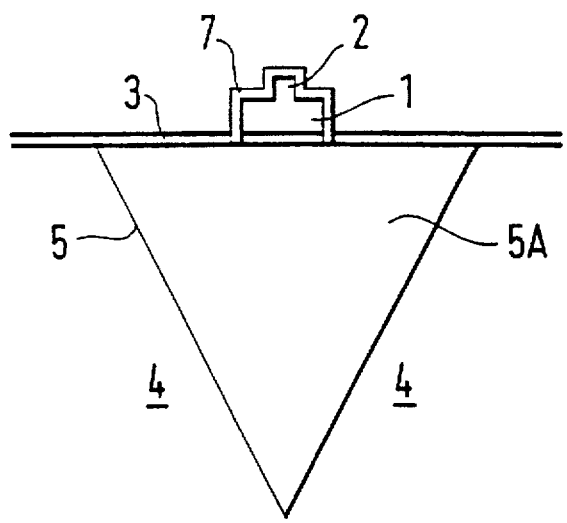
FIG. 3 is a section taken along line a—a of FIG. 2.

The width of the layer of silicon dioxide left protruding over the end of the groove 5 is preferably greater than the width of the rib waveguide 2, as shown in FIG. 2, so as to provide the projection with additional strength. The width of the silicon dioxide layer a needs to be sufficient to support the silicon slab either side of the rib waveguide 2 (as shown in FIG. 3 ). If, for example, the rib waveguide 2 has a width of around 4 microns, the width of the layer of silicon dioxide protruding over the end of the groove should be at least 20 microns, and preferably around 40 microns. The width of the silicon dioxide layer also needs to be sufficient for optimal waveguide operation, hence the minimum width of 20 microns.

A further advantage of this method of connecting silicon waveguide to an optical fibre is that the end face of the waveguide 2 can be defined by a dry etch process during fabrication of the connection so there is no need to polish the end face manually or run a saw blade thereacross to provide a flat face on the end of the waveguide 2.

The optical fibre 6 is preferably secured within the groove 5 by means of adhesive (not shown) or it may be soldered or clamped in place. An adhesive or other refractive index matching material may also be provided between the ends of the waveguide 2 and fibre core 6A to reduce losses caused by refractive index mis-matches at this interface. If the material used has a refractive index matching that of the optical fibre core 6A, this also reduces the requirement for the end face of the optical fibre core to be very flat.

Figure 4:
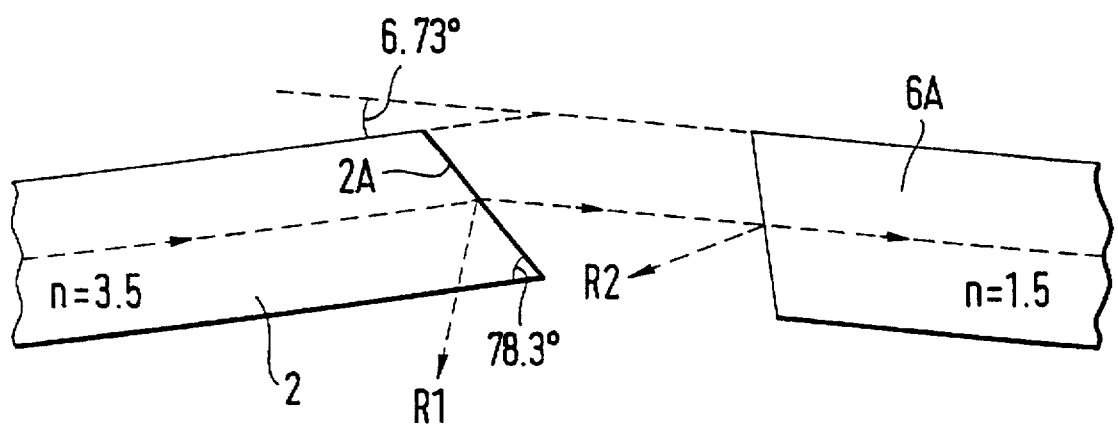
FIG. 4 is a schematic diagram illustrating the preferred alignment between the silicon waveguide and the optical fibre.

As the refractive index of silicon is relatively high (n=3.5) compared to that of other materials such as silicates (n=1.5), the end face of the rib waveguide 2 is preferably not perpendicular to the axis of the waveguide so that losses due to back-reflections (R1) from the face are minimised. This is illustrated in FIG. 4 which shows the end face 2A of the waveguide at an angle of about 78.3 degrees to the axis of the waveguide. The angled end face of the waveguide is preferably formed by a dry etch process. As the end face 2A of the waveguide 2 is not perpendicular to the axis of the waveguide and because of the appreciable difference in refractive index of silicon and the media in contact with this face (refractive index matching compounds typically have a refractive index of around 1.5, i.e. closer to that of the fibre optic core rather than that of silicon), light emerging from the waveguide 2 will undergo appreciable refraction, typically of the order of 6 to 7 degrees.

The end face of the fibre optic core may also not be perpendicular to the fibre optic axis again to reduce losses due to reflection (R2) at this interface. However, if the index matching compound has the same refractive index as the fibre optic core, no refraction will occur at this interface so the axis of the optical fibre will be parallel to the light emerging from the end face 2A of the waveguide.

In view of the above, the axes of the waveguide and optical fibre should preferably be inclined to each other, typically by around 6 to 7 degrees, to take account of the refraction and ensure that the maximum amount of light leaving the waveguide enters the optical fibre core (or vice versa).

An anti-reflective coating, e. g. a dielectric compound such as silicon nitride, is also preferably provided on the end face 2A of the waveguide to reduce the back reflection R1 therefrom.

Shoulders 8 or other stopping means may be formed adjacent the end of the V-groove to prevent the optical fibre hitting the waveguide as the fibre is slid along the groove 5 towards the rib waveguide 2. This reduces the risk of accidentally breaking off the projecting portion of the waveguide by impact from the optical fibre 6. However, the arrangement should still be designed such that the end of the fibre may be positioned in close proximity to the end of the waveguide (preferably within 5 microns or less thereof).

As mentioned above, the device is preferably constructed from a conventional silicon-on-insulator wafer which comprises a silicon wafer implanted with a layer of silicon dioxide.

The position of both the waveguide and the V-groove are preferably defined by a single masking step. They are then automatically aligned with each other and further accurate masking is not required to ensure alignment therebetween.

The connection described above enables an optical fibre to be accurately and reliably aligned with an integrated silicon waveguide. The V-groove and undercut are formed at appropriate stages in the fabrication of the integrated device and can be formed with great accuracy. An optical fibre 6 can then be positioned in the groove by a low tolerance production machine, e.g. a surface mount pick and place machine, as once the fibre engages the groove 5 it is guided by the walls of the groove into precise alignment with the waveguide 2.

The connection described enables optical fibres to be accurately and reliably aligned with integrated waveguides. An alignment to within less than 0.5 microns is generally required for efficient coupling therebetween (so that losses at the interface are 1 dB or less) and this can be achieved with this form of connection.

We claim:

1. A connection between an integrated optical waveguide and an optical fibre, the integrated optical waveguide comprising a layer of silicon in which a rib waveguide is formed separated from a substrate by a layer of silicon dioxide, a V-groove being formed in the substrate for receiving an optical fibre and arranged so as to align the optical fibre at a predetermined angle to the waveguide, the rib waveguide and underlying layer of silicon dioxide being formed so as to overhang the end of the V-groove so the end of the waveguide is in close proximity with the end of an optical fibre positioned in the V-groove.

2. A connection as claimed in claim 1 in which the V-groove has an end face which is not perpendicular to the base of the groove, the rib waveguide and underlying layer of silicon dioxide projecting over the said end face.

3. A connection as claimed in claim 1 in which a flat face is formed on the end of the rib waveguide.

4. A connection as claimed in claim 3 in which the said face is not perpendicular to the axis of the rib waveguide.

5. A connection as claimed in claim 3 in which an anti-reflective coating is provided on the said flat flace.

6. A connection as claimed in claim 1 in which a refractive index matching material bridges the interface between the end of the rib waveguide and the end of an optical fibre positioned in the V-groove.

7. A connection as claimed in claim 1 in which stop means are provided in the V-groove to prevent an optical fibre which is being slid along the groove towards the waveguide from hitting the overhanging portion of the waveguide.

8. A connection as claimed in claim 1 in which at least one of the width and the height of the rib waveguide is in the range 2 to 10 microns.

9. A connection as claimed in claim 8 in which the core of the optical fibre has a diameter in the range 5 to 10 microns.

10. A connection as claimed in claim 8 in which the overhanging portion of the underlying layer of silicon dioxide has a width of at least 20 microns.

11. A connection as claimed in claim 8 in which the overhanging portion of the underlying layer of silicon dioxide has a width of approximately 40 microns.

12. A connection as claimed in claim 1 in which the width of the overhanging portion of the underlying layer of silicon dioxide is greater than the width of the overhanging portion of the rib waveguide.

13. A connection as claimed in claim 12 in which the overhanging portion of the underlying layer of silicon dioxide has a width of at least 20 microns.

14. A connection as claimed in claim 12 in which the overhanging portion of the underlying layer of silicon dioxide has a width of approximately 40 microns.

15. A connection as claimed in claim 1 in which at least one of the width and the height of the rib waveguide is approximately 4 microns.

16. A connection as claimed in claim 1 in which the said predetermined angle is in the range 6 to 7 degrees.

17. A connection as claimed in claim 1 in which the integrated waveguide is formed from a conventional silicon-on-insulator wafer which has been modified by increasing the thickness of the top layer of silicon.

18. A connection as claimed in claim 1 in which the end of the optical fibre is positioned 5 microns or less from the end of the waveguide.

19. A method of forming a connection between an integrated optical waveguide and an optical fibre, the integrated optical waveguide comprising a layer of silicon in which a rib waveguide is formed separated from a substrate by a layer of silicon dioxide, a V-groove being formed in the substrate for receiving an optical fibre and arranged so as to align the optical fibre at a predetermined angle to the waveguide, the rib waveguide and underlying layer of silicon dioxide being formed so as to overhang the end of the V-groove so the end of the waveguide is in close proximity with the end of an optical fibre positioned in the V-groove, in which the V-groove is etched using a material which preferentially etches the substrate material as opposed to the layer of silicon dioxide.

20. A method as claimed in claim 19 in which the etchant is an anisotropic etchant.

21. A method as claimed in claim 19 in which a protective layer is provided over the rib waveguide prior to etching of the said V-groove.

22. A method as claimed in claim 21 in which the protective layer extends over the end face of the rib waveguide.

23. A method as claimed in claims 21 in which the protective layer comprises silicon dioxide.

24. A method as claimed in claim 9 in which a flat face is formed on the end of the waveguide by means of a dry etch process.

25. A method as claimed in claim 19 in which the etchant is CsOH.

26. A method of connecting an integrated optical waveguide to an optical fibre, comprising the steps of:
  (a) providing an integrated optical waveguide having a layer of silicon in which a rib waveguide is formed separated from a substrate by a layer of silicon dioxide, a V-groove is formed in the substrate for receiving an optical fibre and arranged so as to align the optical fibre at a predetermined angle to the waveguide, and the rib waveguide and underlying layer of silicon dioxide are formed so as to overhang the end of the V-groove; and
  (b) positioning an end of an optical fibre in said V-groove so that the end of the optical fibre is in close proximity to an end of said waveguide.

* * * * *

UNITED STATES PATENT AND TRADEMARK OFFICE
CERTIFICATE OF CORRECTION

PATENT NO. : 5,787,214
DATED : July 28, 1998
INVENTOR(S) : Arnold P. R. Harpin et al.

It is certified that error appears in the above-identified patent and that said Letters Patent is hereby corrected as shown below:

Title Page, insert:
--[30] Foreign Application Priority Data
May 6, 1995 [GB] Great Britain.... 9509302--.

Column 1 Line 24 "grave" should read --groove--.

Column 2 Line 57 "or around" should read --of around--.

Column 2 Line 63 "overhanging toe" should read --overhanging the--.

Column 3 Line 11 "prefer ably" should read --preferably--.

Column 3 Line 14 "layer a" should read --layer also--.

Claim 24 Column 6 Line 20 "in claim 9" should read --in claim 19--.

Signed and Sealed this

First Day of December, 1998

Attest:

BRUCE LEHMAN

Attesting Officer

Commissioner of Patents and Trademarks